No. 852,357. PATENTED APR. 30, 1907.
S. S. TEAGUE.
AUTOMATIC CONTROL DEVICE FOR ELEVATORS.
APPLICATION FILED MAY 16, 1906.
5 SHEETS—SHEET 1.
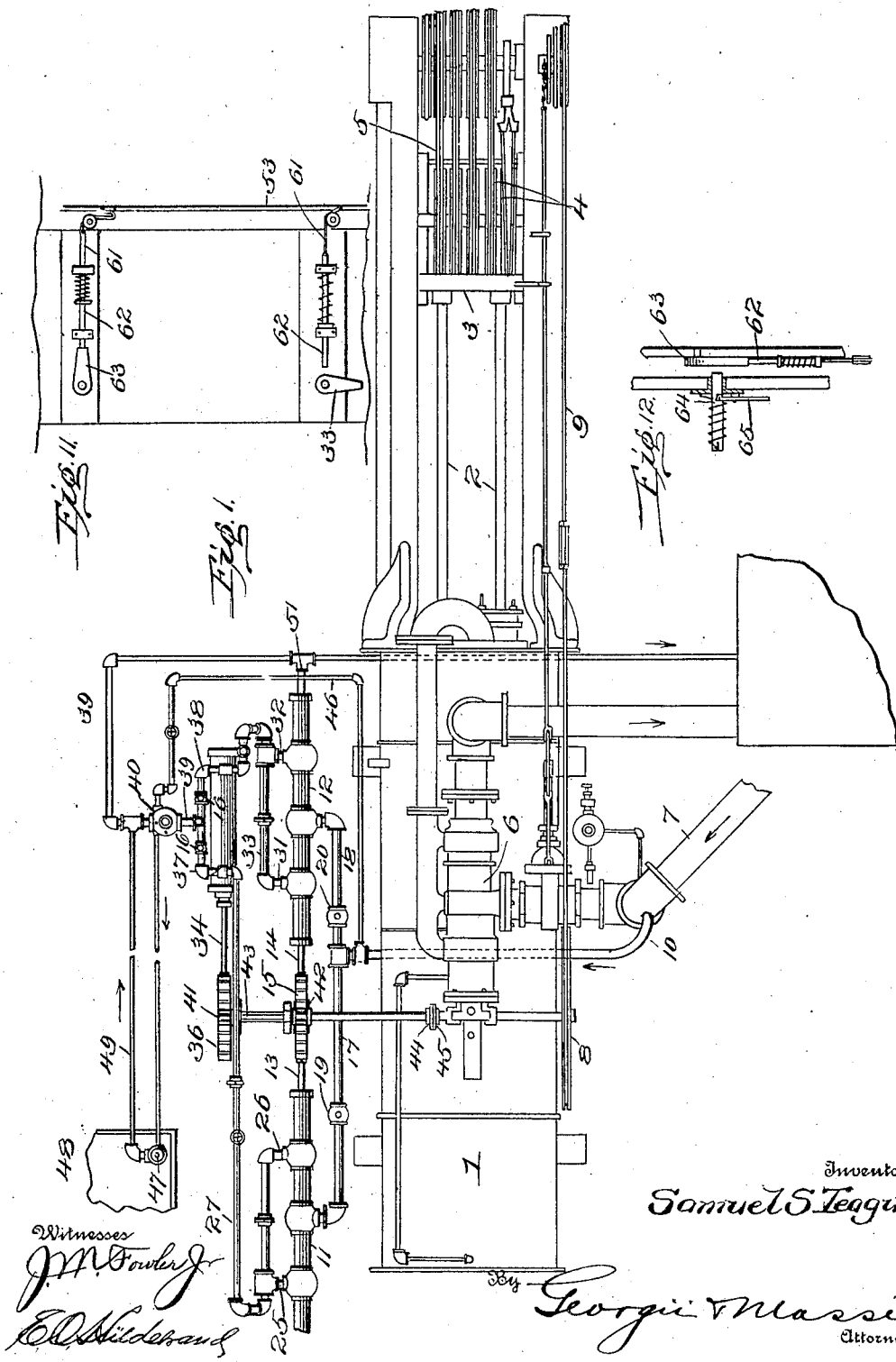
Witnesses
Inventor
Samuel S. Teague
By George T. Massie
Attorneys

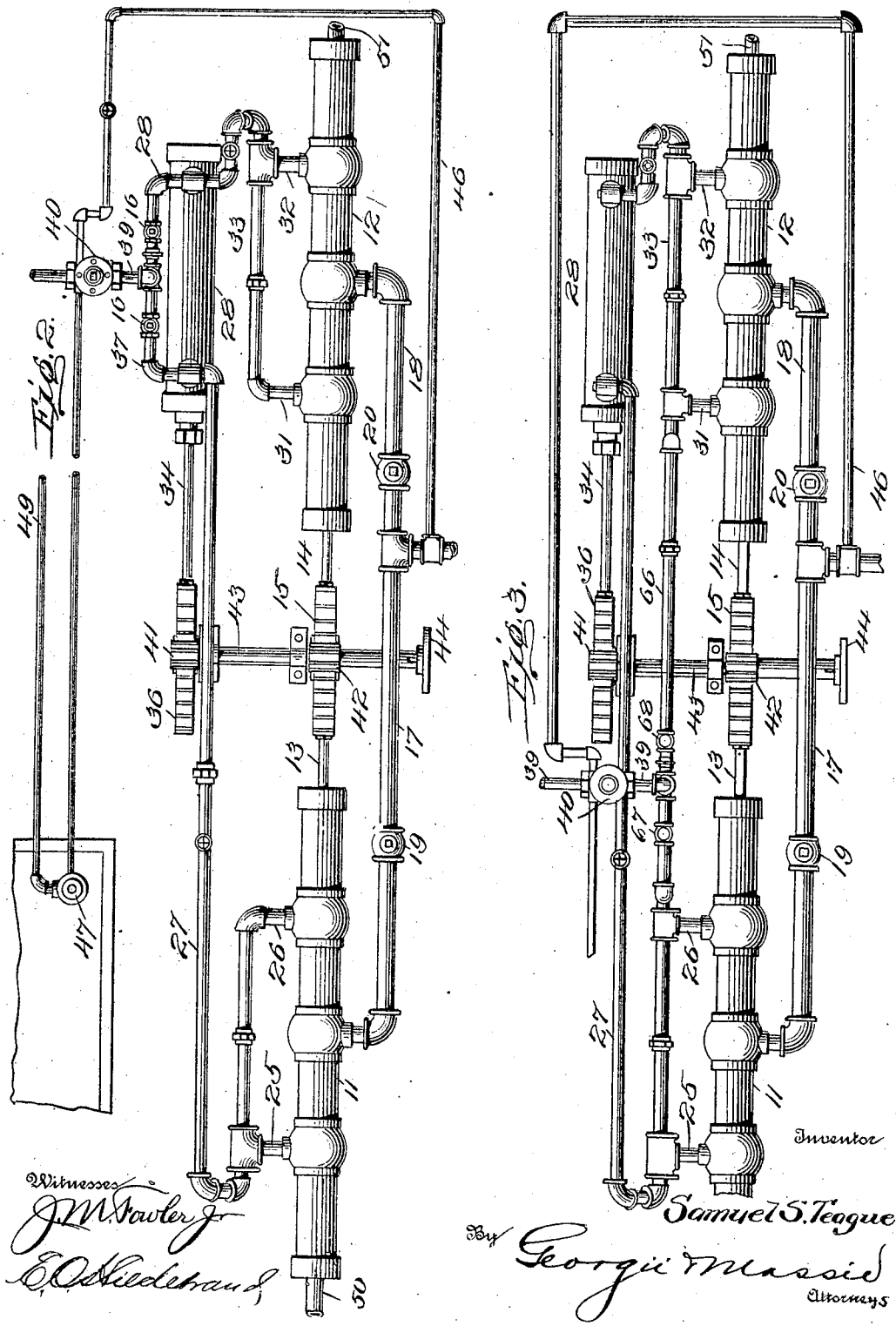

No. 852,357. PATENTED APR. 30, 1907.
S. S. TEAGUE.
AUTOMATIC CONTROL DEVICE FOR ELEVATORS.
APPLICATION FILED MAY 16, 1906.
5 SHEETS—SHEET 3.
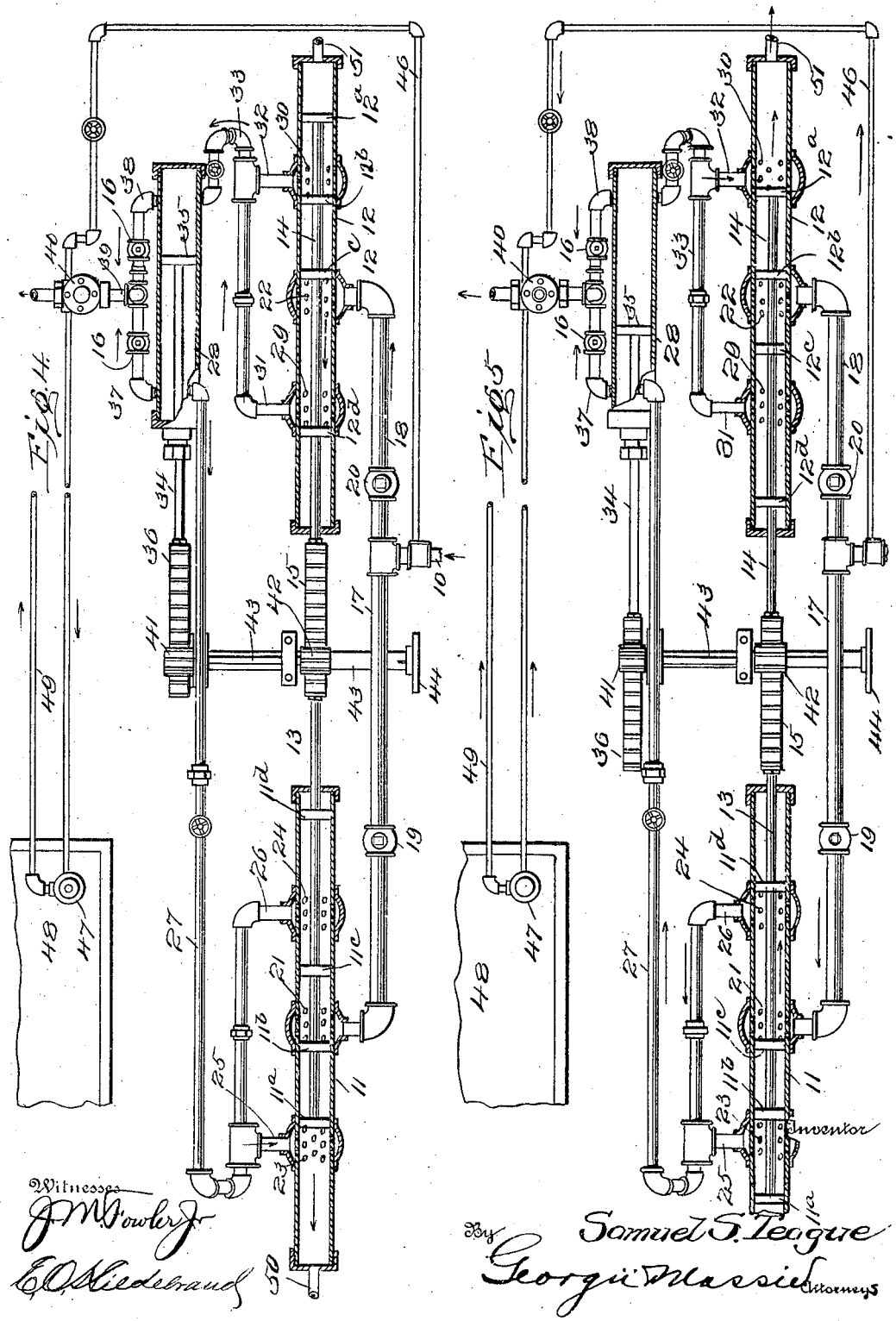
Witnesses
J. M. Fowler Jr.
E. D. Hildebrand
Inventor
Samuel S. Teague
By George Massie
Attorneys

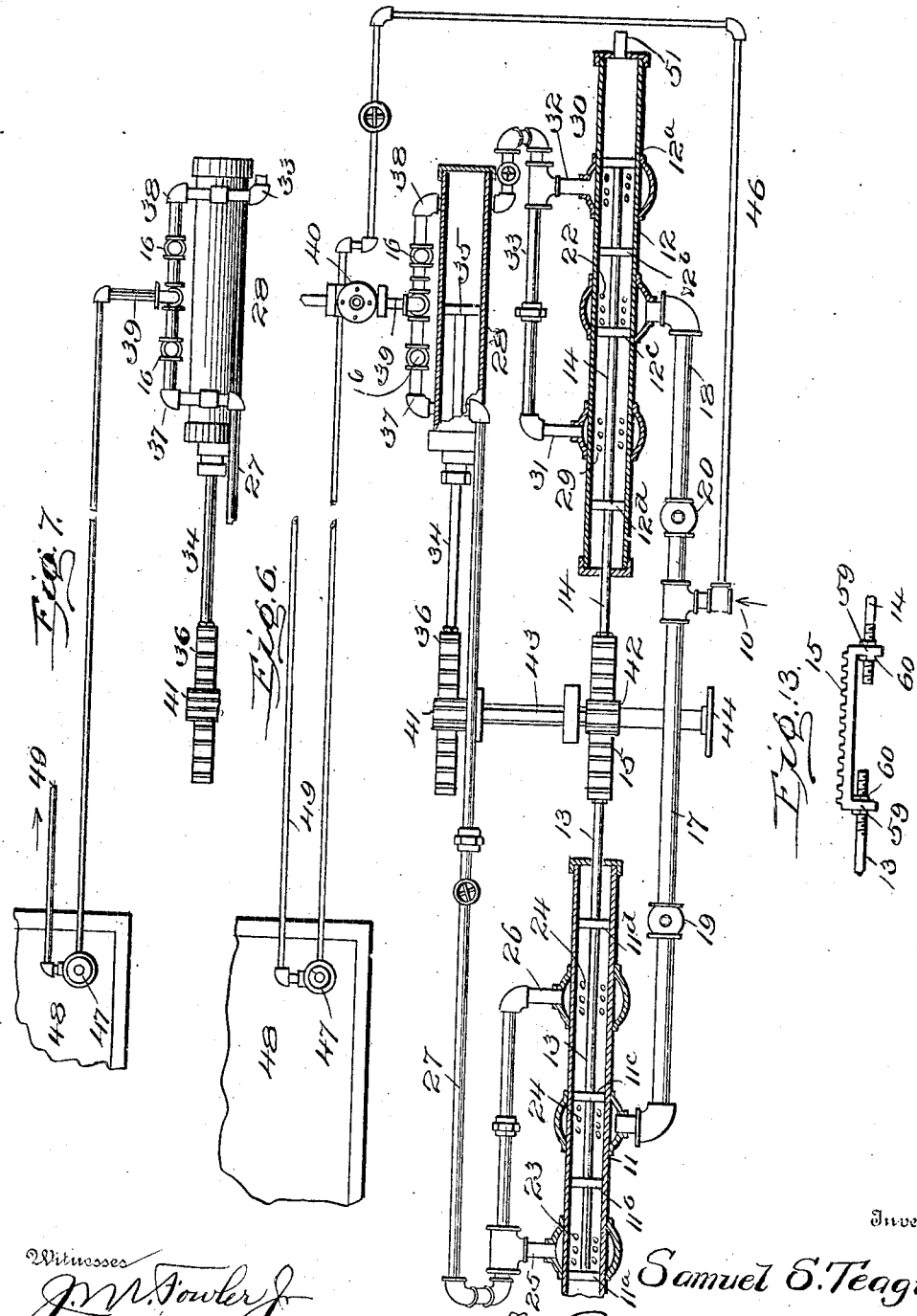

No. 852,357. PATENTED APR. 30, 1907.
S. S. TEAGUE.
AUTOMATIC CONTROL DEVICE FOR ELEVATORS.
APPLICATION FILED MAY 16, 1906.
5 SHEETS—SHEET 5.
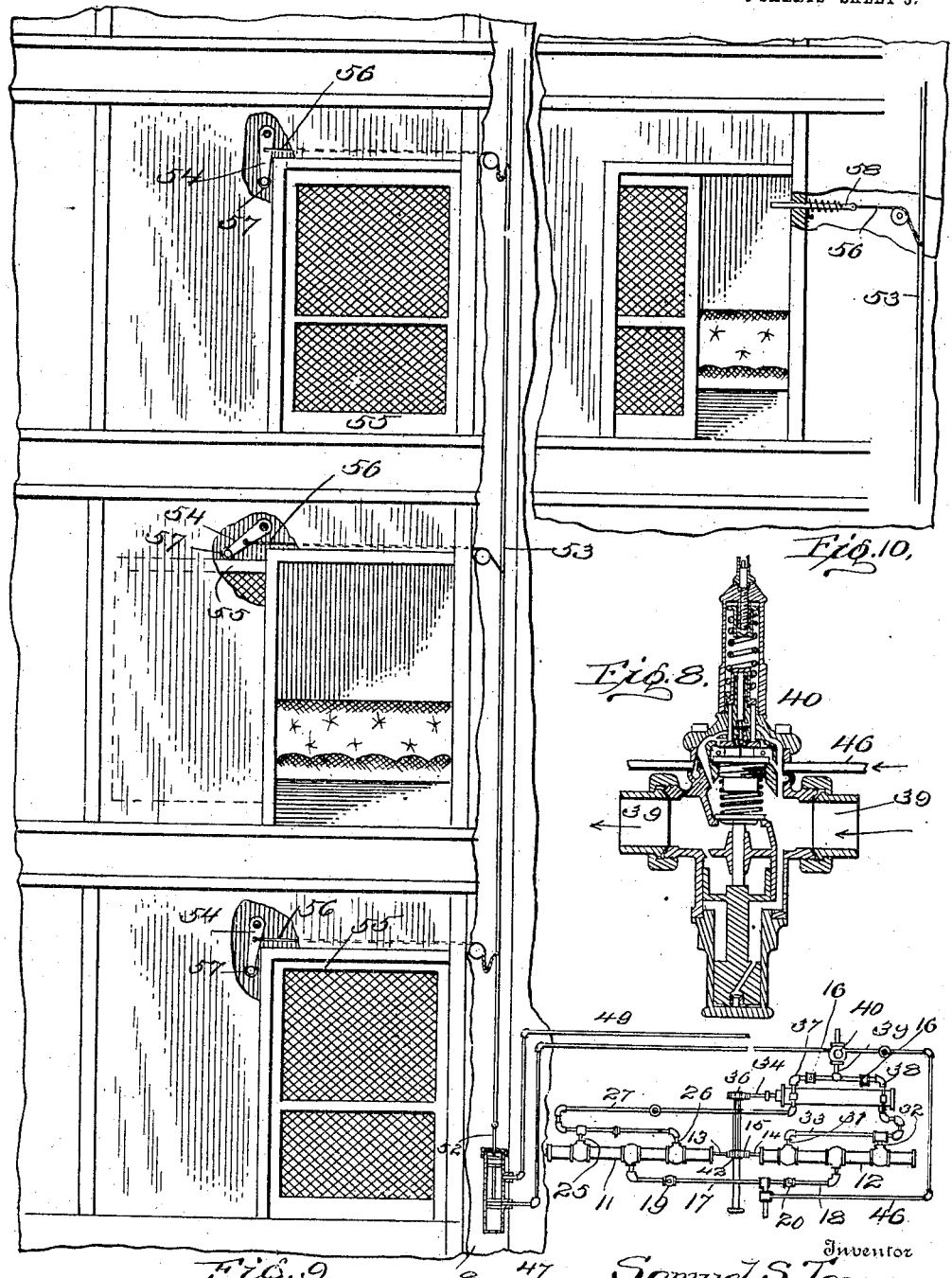

UNITED STATES PATENT OFFICE.

SAMUEL S. TEAGUE, OF WASHINGTON, DISTRICT OF COLUMBIA, ASSIGNOR OF FIFTY-ONE ONE-HUNDREDTHS TO JOSEPH I. SAKS.

AUTOMATIC CONTROL DEVICE FOR ELEVATORS.

No. 852,357.    Specification of Letters Patent.    Patented April 30, 1907.

Application filed May 16, 1906. Serial No. 317,226.

*To all whom it may concern:*

Be it known that I, SAMUEL S. TEAGUE, engineer, a citizen of the United States, residing at 936 E street northwest, Washington, District of Columbia, have invented certain new and useful Improvements in Automatic-Control Devices for Elevators; and I do hereby declare the following to be a full, clear, and exact description of the invention, such as will enable others skilled in the art to which it appertains to make and use the same.

My invention relates to automatic control devices for elevators and has for its object means by which the operation of the elevator is automatically controlled by the opening and closing of the elevator door. In devices of this general character, it is old to provide of this general character, it is old to provide means whereby the elevator having been stopped at a particular landing and the door opened, a start cannot again be made until the door is closed; also to provide means such as counterweights or springs whereby when the operating lever is released, it will return to its inoperative position; also to provide for the shutting off of the water supply to the operating cylinder upon the opening of the elevator door or similar contingency. As distinguished from these, my invention provides that upon the opening of the elevator door, for instance, means are set in motion whereby through hydraulic pressure, the shipper mechanism is itself thrown to an inoperative position and there locked until the door be closed.

The invention consists, moreover, in certain features of construction whereby the different elements co-operate to secure the desired result in a perfectly automatic and entirely certain and efficient manner.

The invention, as hereinafter more fully described and as particularly set out in the claims, will be readily understood from an inspection of the accompanying drawings setting forth a preferred embodiment of the same and modifications.

In these drawings Figure 1 is a general view of the device assembled in connection with the operating cylinder of an elevator; Fig. 2 is a plan view of the same disconnected; Fig. 3 is a modification; Fig. 4 is a horizontal section through the valve mechanism shown in Fig. 2 in one position of operation; Fig. 5 is a similar view to Fig. 4 in the other extreme position of operation; Fig. 6 is a similar view at an intermediate position; Fig. 7 is a further modification; Fig. 8 is a detail view of a regulating valve employed; Fig. 9 is a view showing an operative connection between the device and the elevator doors; Fig. 10 shows a modified form of connection from that shown in Fig. 9; Fig. 11 is a detail view showing a trip mechanism; Fig. 12 is a plan view showing a connection between the trip and its operating device; and Fig. 13 is a detail of the rack adjustment.

While the invention may be readily applied to any ordinary form of elevator, I have illustrated and will describe the same as connected with a hydraulic elevator.

The main operating cylinder or motor 1 containing the usual pistons operating, by and through the piston rods 2 and the cross head 3, upon the sheaves 4 to communicate motion by means of the ropes 5 to the elevator car in a well known manner, is supplied with water through the main or operating valve 6 of ordinary construction from a pressure tank (not shown) by means of a pipe 7. This operating valve is manipulated in the well known way from a pulley 8 operated from the car by the shipper rope 9. The manipulation of this operating valve might be effected by means of levers, rods or any other well known structure, the term "shipper mechanism" being used hereinafter to embrace any means for controlling the motor from the car to start and stop the elevator.

A fluid pressure pipe 10 tapping the supply from the pressure tank leads to an auxiliary valve mechanism forming a part of my invention and composed, preferably, of twin valves 11 and 12, the stems 13 and 14 of which are adjustably connected to the rack 15 and provided with disks $11^a$, $11^b$, $11^c$ and $11^d$ and $12^a$, $12^b$, $12^c$ and $12^d$ respectively. The connection between the pressure pipe 10 and the auxiliary valve mechanism is by means of branches 17 and 18 containing check valves 19 and 20 permitting of a flow in a forward direction only, the branches 17 and 18 communicating with the respective valves 11 and 12 by ports 21 and 22. The two ports 23 and 24 of the valve 11 lead by way of the branches 25 and 26 of the pipe 27 to one end of a valve motor 28 while the ports 29 and 30 of the valve 12 lead by way of branches 31 and 32 of the pipe 33 to the opposite end of the valve motor 28. By the stem 34 of the valve motor 28 is carried a disk 35, and to the stem 34 is likewise adjustably secured a rack 36. Pipes 37 and 38 each containing a check valve as shown, lead from the opposite ends of the valve motor 28 to a discharge pipe 39 containing a regulating valve 40 to be hereinafter more particularly described.

The rack 36 attached to the valve stem 34 and the rack 15 connecting the valve stems 13 and 14 are respectively in engagement with pinions 41 and 42 keyed to a common spindle 43 rigidly connected by a coupling member 44 with a similar coupling member 45 fixed upon the spindle of the shipper mechanism, which spindle controls the main valve 6, wherefore it will be seen that any movement of the auxiliary valves will be positively transmitted to the shipper mechanism and also to the operating valve.

A small pipe 46 leads from the pressure pipe 10 by way of the regulating valve 40 to a control valve 47 located adjacent to the lower portion of the elevator shaft 48 from whence a waste pipe 49 leads to the discharge pipe 39 and thence to the open tank. Waste pipes 50 and 51 likewise lead to the same point of discharge.

The control valve 47, shown in section in Fig. 10, is a simple balanced valve having an inlet from pipe 46 and an outlet to pipe 49 with spaced disks so arranged that in the upper position the lower disk closes the inlet and in the lower position the inlet and outlet communicate by means of the space between the disks. The stem and disks of this valve are raised to close the same in the manner hereinafter described and they return to the normal open position of their own weight.

The regulating valve 40, preferably used, is of the Mason type shown in detail in Fig. 8, although other regulating valves of known construction might be employed. The construction of this valve is well known to be such that the passage of fluid therethrough by the pipe 39 is controlled by the pressure in the pipe 46, wherefore if, by the closing of the valve 47, the pressure in the pipe 46 is increased, the regulating valve 40 closes the discharge 39.

Attached to the stem 52 of the valve 47 is a cord or rope or rod 53 extending upward through the elevator shaft. Levers 54, pivoted above the doors 55, are connected to the cord 53 by cords 56. The free end of the levers 54 is provided with an anti-friction roll 57 arranged to ride upwardly upon the door when opened, as shown in the central portion of Fig. 9, thereby exerting tension upon the lifting cord 53 to close the valve 47 whenever the door is opened and permitting the same to drop and to open the valve 47 when the door is closed.

Instead of employing the lever described above, to be operated by the opening of the door, a spring pressed bolt 58 may be employed, as shown in Fig. 10 which, if released by the opening of the door, will, under the tension of the spring, lift the cord 53 with the same result.

The operation of the device is as follows: When all of the doors of the elevator are closed, the valves 47 and 40 will be open and the operating valve or motor of the elevator remain under the perfect control of the conductor by the shipper mechanism. If, for instance, the elevator is ascending, the operating or main valve 6 will, by means of the shipper mechanism, have been thrown to an extreme position and such movement of the shipper mechanism by the rack and pinion connection, will have also thrown the auxiliary valve mechanism into the position shown in Fig. 4, the water from the pressure pipe 10 passing through the pipe 18 past the check valve 20, through the ports 22 and 29 of the valve 12, thence through the pipes 31 and 33 into the right end of the valve motor 28, and thence through the pipe 38 and the discharge pipe 39 to the open tank, the valve 40 being open, and the water having free course through the auxiliary valves and valve motor. If, on the other hand, the elevator be descending, the auxiliary valve and motor mechanism will, by reason of the shifting of the shipper mechanism, occupy a position at the other extreme as shown in Fig. 5. In this case, the passage of the water through the auxiliary valves is by way of the pipes 10 and 17, past the check valve 19, through the ports 21 and 24 of the valve 11, the pipe 26 and 27 to the left hand end of the valve motor 28, and thence through the pipe 37 and the discharge pipe 39 to the open tank, the valve 40 being open as before. If the elevator be brought to a standstill, the shipper mechanism being shifted to an intermediate position, the coupling between the said shipper mechanism and the racks 36 and 15 will likewise bring the valves of the auxiliary valve mechanism to an intermediate position as represented in Fig. 6, in which case, the water from the pressure pipe 10 attempting to flow through either the pipe 17 and the valve 11 or through the pipe 18 and the valve 12 is trapped between the disks 11$^b$ and 11$^c$, and 12$^b$ and 12$^c$ occupying positions on each side of the ports 21 and 22 respectively, balancing the valves 11 and 12. It will thus be seen that so long as the valve 40 is open and there is no obstruction to the flow of water through the auxiliary valve and motor mechanism, said auxiliary mechanism is entirely idle and does not in any way affect the manipulation, by the conductor, of the main or operating valve and the motor cylinder, said operating valve being acted upon directly by the shipper mechanism and not indirectly through other valve mechanism. If, however, during the ascent of the elevator, the auxiliary mechanism being in the position shown in Fig. 4, one of the doors of the elevator should from any cause become open, an upward pull upon the cord 53 will close the control valve 47 and through it the regulating valve 40 to obstruct the flow of water through the auxiliary valve and motor mechanism. As a result, the water in the right hand end of the valve motor 28 finding no egress through the pipes 38 and 39, exerts its pressure to the left upon the disk 35, driving said disk with its stem 34 and rack 36 to the left, the water in the left hand end of the valve motor finding egress through the pipes 27 and 25 and the port 23 to the open tank through the pipe 50. This movement continues until the rack has reached the intermediate position shown in Fig. 6, when the disk 11$^a$ carried by the valve stem 13 will have closed the passage from the port 23 to the discharge pipe 50 and thus have equalized the pressure on both sides of the disk 35, at which time also the inlet port 22 to the valve 12 will be closed by the disks 12$^b$ and 12$^c$ occupying positions on both sides thereof as shown in said Fig. 6. This movement of the disk 35 with its stem 34 and rack 36 to the position shown in Fig. 6, will be positively transmitted by the coupling 44, 45 to the shipper mechanism, also closing the operating valve to the motor cylinder and stopping the elevator.

If the elevator be descending and the valve mechanism in the position shown in Fig. 5, when the elevator door is opened, the movement will be the reverse, that is, the closing of the valve 40 will cause the pressure of the water in the left hand end of the valve motor 28 to drive the disk 35 with its stem 34 and rack 36 to the right carrying with it, by means of the connection through the pinions 41 and 42, the stems 13 and 14 of the valves 11 and 12. The water in the right hand end of the valve motor 28 will escape through the pipes 33 and 32 to the right hand end of the valve 12 through the port 30 and thence to the discharge 51. This movement will continue until the disk 12$^a$ on the valve stem 14 reaches a position to cut off the flow through the port 30 to the discharge 51, whereupon the pressure on the two sides of the piston 35 will be equalized and the inlet of water to the valve 11 will be prevented by the two disks 11$^b$ and 11$^c$ occupying positions on opposite sides of the port 21. At this time, again, the auxiliary mechanism will occupy the position shown in Fig. 6 and the motion will have been transmitted to the main valve and to the shipper mechanism which will then be in an inoperative position and the elevator will be stopped. In either case, the main valve and shipper mechanism are locked in this inoperative position, it being impossible to shift either because of the water trapped on both sides of the disk 35 in the valve motor 28, any interchange flow between the two ends by way of the pipes 37 and 38 being prevented by the check valves 16 therein. The shipper mechanism cannot be brought into a position to operate the elevator until the door is closed.

If it be desired to permit the elevator to proceed, but at greatly reduced speed after the closing of the valve 40 by the opening of a door, this result can be attained by so adjusting the connection between the racks 15 and the stems 13 and 14, and between the rack 36 and the stem 34, as to set the operating valve of the elevator slightly in advance or behind the auxiliary valves to effect a partial instead of a complete throttling of the motive fluid in the main valve. In order to provide for this and also to enable any lost motion to be taken up in the rack connections, the ends of the valve stems are threaded and connected with flanges 59 of the racks in the manner shown in Fig. 13, lock nuts 60 securing a fixed relation between the two.

The construction described for the closing of the valves 40 and 47 is arranged to be operated by the opening of the elevator door. Obviously, it may be automatically operated by the happening of other contingencies, or provision may be made whereby it may be manually operated.

In Figs. 11 and 12, I have shown a trip mechanism by means of which in case of accident as by the breaking of the shipper rope, the conductor will be able to stop the elevator otherwise than by opening an elevator door. In this case, the cord 53 is connected by cords 61 to spring operated bolts 62 in a manner similar to that described with reference to Fig. 9, the difference being that these bolts are not released by the opening of the door but are under all ordinary conditions held in an inoperative position by means of a detent 63 pivotally mounted and bearing against the end of the bolt 62 on the inside wall of the elevator shaft. Upon the car a spring pressed bolt 64 is held retracted by the engagement of a catch 65 in a notch cut in said bolt. If, during the ascent or descent of the elevator, the shipper rope were to break or become otherwise inoperative, the conductor may release the catch 65 from the bolt 64 which will then be projected outwardly far enough to contact with one of the detents 63 and throw it into the position shown at the lower end of Fig. 11, permitting the bolt 62, under the tension of its spring, to lift the cord 53 and close the valves 40 and 47 thus again throwing the main valve and the shipper mechanism into an inoperative position and stopping the elevator.

In Fig. 3 is shown a modified connection between the auxiliary mechanism and the control valve, the discharge pipe 39 being tapped into a pipe 66 connecting pipes 26 and 31 and provided with check valves 67 and 68. In this case, when the auxiliary valves are idle, the flow being unobstructed by the valve 40, the water does not pass through the valve motor 28 but directly from the valves 11 and 12 through the pipe 66 past the check valves 67 or 68 as the case may be to the discharge. The operation is precisely the same as in the construction heretofore described in detail.

As a matter of convenience, I have found it desirable to use the regulating valve 40 which is closed by the closing of the valve 47, but its use may be dispensed with. If the valve 47 be placed directly in the pipe 39, the valve 40 and the pipe 46 are not needed, the lifting of the cord 53 shutting off directly, by means of the valve 47, the flow of water through the pipe 39, as indicated in Fig. 7.

Having thus described my invention, what I claim as new and desire to secure by Letters Patent, is:

1. In a control device for elevators, the combination, with the motor, and shipper mechanism controlling the same, of means acting independently of the shipper mechanism to stop the motor and throw the shipper mechanism to its inoperative position.

2. In a control device for elevators, the combination, with the motor, and shipper mechanism controlling the same, of means acting independently of the shipper mechanism by fluid pressure to stop the motor and throw the shipper mechanism to its inoperative position.

3. In a control device for elevators, the combination, with the motor, and shipper mechanism controlling the same, of means acting independently of the shipper mechanism to stop the motor and throw the shipper mechanism to its inoperative position and lock the same.

4. In a control device for elevators, the combination, with the motor, and shipper mechanism controlling the same, of means acting automatically and independently of the shipper mechanism to stop the motor and throw the shipper mechanism to its inoperative position.

5. In a control device for elevators, the combination, with the motor, and shipper mechanism controlling the same, of means acting automatically and independently of the shipper mechanism upon the opening of the elevator door to stop the motor and throw the shipper mechanism to its inoperative position.

6. In a control device for elevators, the combination, with the motor, an operating valve, and a shipper mechanism for opening and closing the said valve, of means operating automatically and independently of the shipper mechanism upon the opening of an elevator door to close said valve.

7. In a control device for elevators, the combination, with the motor, and shipper mechanism controlling the same, of means acting independently of the shipper mechanism to stop the motor, and a connection between the said means and the shipper mechanism whereby they normally operate in unison.

8. In a control device for elevators, the combination, with the motor, and shipper mechanism controlling the same, of means acting automatically and independently of the shipper mechanism upon the opening of the elevator door to stop the motor, and a connection between the said means and the shipper mechanism whereby they normally operate in unison.

9. In a control device for elevators, the combination, with the motor, and shipper mechanism controlling the same, of an auxiliary valve and motor system, means acting automatically through the said auxiliary system, and independently of the shipper mechanism to stop the motor, and a connection between the auxiliary system and the shipper mechanism whereby they normally act in unison.

10. In a control device for elevators, the combination, with the motor, and shipper mechanism controlling the same, of an auxiliary valve and motor system, means acting automatically through the said auxiliary system and independently of the shipper mechanism upon the opening of the elevator door to stop the motor, and a connection between the auxiliary system and the shipper mechanism whereby they normally act in unison.

11. In a control device for elevators, the combination, with the motor, and shipper mechanism controlling the same, of an auxiliary valve and motor system acting upon the motor independently of the shipper mechanism, and means acting automatically through the said auxiliary system to stop the motor and throw the shipper mechanism to its inoperative position.

12. In a control device for elevators, the combination, with the motor, and shipper mechanism controlling the same, of an auxiliary valve and motor system acting upon the motor independently of the shipper mechanism, and means acting automatically through the said auxiliary system upon the opening of an elevator door to stop the motor and throw the shipper mechanism to its inoperative position and lock the same.

13. In a control device for elevators, the combination, with an operating valve and shipper mechanism acting thereon, of an auxiliary valve and motor system coupled with the shipper mechanism, a pressure fluid supply to the auxiliary system, a control valve governing the discharge therefrom, and means to actuate the control valve to cause the operation by pressure fluid of the auxiliary system and through it the shifting of the shipper mechanism to an inoperative position.

14. In a control device for elevators, the combination, with an operating valve and shipper mechanism acting thereon, of an auxiliary valve and motor system coupled with the shipper mechanism, a pressure fluid supply to the auxiliary system, a control valve governing the discharge therefrom, and means actuated by the opening of the elevator door to close the control valve to cause the operation by pressure fluid of the auxiliary system and through it the shifting of the shipper mechanism to an inoperative position.

15. In a control device for elevators, the combination with an operating valve and shipper mechanism acting thereon, of an auxiliary valve and motor system positively coupled with the shipper mechanism, a pressure fluid supply to the auxiliary system, a control valve governing the discharge therefrom, and means actuated by the opening of the elevator door to close the control valve to cause the operation by the pressure fluid of the auxiliary system and through it the shifting of the shipper mechanism to an inoperative position.

16. In a control device for elevators, the combination, with an operating valve and shipper mechanism acting thereon, of an auxiliary valve and motor system positively coupled with the shipper mechanism, a pressure fluid supply to the auxiliary system, a regulating valve in the discharge therefrom a control valve governing the operation of the regulating valve, and means operating automatically to actuate the control valve to close the regulating valve to cause the operation by the pressure fluid of the auxiliary system and through it the shifting of the shipper mechanism to an inoperative position.

17. In a control device for elevators, the combination, with an operating valve and shipper mechanism acting thereon, of an auxiliary valve and motor system coupled with the shipper mechanism, a pressure fluid supply to the auxiliary system, a regulating valve operable by variations in fluid pressure arranged in the discharge therefrom, an auxiliary pressure fluid pipe around the auxiliary system by way of the regulating valve to a point adjacent the elevator shaft, a control valve in the auxiliary pressure pipe, and means operating automatically upon the opening of the elevator door to close the control valve to operate the regulating valve to cause the operation by the pressure fluid of the auxiliary system and through it the shifting of the shipper mechanism to an inoperative position.

18. In a control device for elevators, the combination with an operating valve and shipper mechanism acting thereon, of an auxiliary valve and motor system positively coupled with the shipper mechanism, a pressure fluid supply to the auxiliary system, a regulating valve operable by variations in fluid pressure arranged in the discharge from the auxiliary system, an auxiliary pressure fluid pipe extending by way of the regulating valve to a point adjacent the elevator shaft, a control valve in the auxiliary pressure pipe, and means connecting the control valve stem with the elevator door whereby the opening of the elevator door will operate the control valve to close the regulating valve to cause the operation by the pressure fluid of the auxiliary system and through it the shifting of the shipper mechanism to an inoperative locked position.

19. In a control device for elevators, the combination, with an operating valve and shipper mechanism acting thereon, of an auxiliary valve and motor system coupled with the shipper mechanism and comprising a pair of twin valves having their stems provided with spaced disks controlling inlet and outlet ports and a valve motor having its stem provided with a disk, a control valve arranged to govern the discharge from the auxiliary system, a pressure fluid supply at one position of the shipper mechanism and valves through one of the twin valves and one end of the valve motor to the discharge and at another position thereof through the other twin valve to the other end of the valve motor and to the discharge, and means operating automatically to close the control valve to cause the pressure fluid within the auxiliary system to act upon the disks and shift the same and the coupled shipper mechanism to an inoperative position.

20. In a control device for elevators, the combination, with an operating valve and shipper mechanism acting thereon, of an auxiliary valve and motor mechanism coupled with the shipper mechanism and comprising a pair of twin valves having their stems rigidly coupled and provided with spaced disks controlling inlet and outlet ports and a valve motor having its stem provided with a disk and coupled with the stems of the twin valves, a control valve arranged to govern the discharge from the auxiliary system, a pressure fluid supply at one position of the shipper mechanism and valves through one of the twin valves and one end of the valve motor to the discharge and at another position thereof through the other twin valve and the other end of the valve motor to the discharge, check valves in the supply to each of the twin valves and between each end of the valve motor and discharge, and means operating automatically upon the opening of an elevator door to actuate the control valve to cause pressure fluid within the auxiliary system to act upon the disks to shift the same and the coupled shipper mechanism to an intermediate position and there lock the same.

21. In a control device for elevators, the combination, with an operating valve and shipper mechanism acting thereon, of an auxiliary valve and motor system comprising a pair of twin valves having their stems rigidly coupled by a rack and provided with spaced disks controlling inlet and outlet ports and a valve motor having its stem provided with a disk and a rack, a spindle coupled to the shipper mechanism and carrying pinions in engagement with the racks, a control valve in the discharge from the auxiliary system, a pressure fluid supply at one position of the valves through one of the twin valves and one end of the valve motor to the discharge and at another position thereof through the other twin valve and the other end of the valve motor to the discharge, check valves in the supply to each of the twin valves and between each end of the valve motor and the discharge, and means operating automatically upon the opening of the elevator door to actuate the control valve to cause the pressure fluid within the auxiliary system to act upon the disks to shift the same and the coupled shipper mechanism to an intermediate position.

22. In a control device for elevators, the combination, with an operating valve and shipper mechanism acting thereon, of an auxiliary valve and motor system coupled with the shipper mechanism and comprising a pair of twin valves having their stems rigidly coupled and provided with spaced disks controlling inlet and outlet ports and a valve motor having its stem provided with a disk and coupled with the stems of the twin valves, a regulating valve operable by variations in fluid pressure arranged in the discharge from the auxiliary system, a pressure fluid supply at one position of the auxiliary valves through one of the twin valves and one end of the valve motor to the discharge and at another position thereof to the other twin valve to the other end of the valve motor to the discharge, an auxiliary pressure pipe extending by way of the regulating valve to a point adjacent the elevator shaft, a control valve in the auxiliary pressure pipe, and means operating automatically upon the opening of the elevator door to actuate the control valve to close the regulating valve to cause the pressure fluid within the auxiliary system to act upon the disks to shift the same and the coupled shipper mechanism to an intermediate position.

23. In a control device for elevators, the combination with an operating valve and shipper mechanism acting thereon, of an auxiliary valve and motor system comprising a pair of twin valves having their stems rigidly coupled by a rack and provided with spaced disks controlling inlet and outlet ports and a valve motor having its stem provided with a disk and with a rack, a spindle coupled to the shipper mechanism and carrying pinions in engagement with the racks, a regulating valve operable by variations in fluid pressure arranged in the discharge from the auxiliary system, a pressure fluid supply at one position of the valves through one of the twin valves and one end of the valve motor to the discharge and at another position thereof through the other twin valve and the other end of the valve motor to the discharge, check valves in the supply to each of the twin valves and between each end of the valve motor and discharge, an auxiliary pressure pipe extending by way of the regulating valve to a point adjacent the elevator shaft, a control valve in the auxiliary pressure pipe beyond the regulating valve, and means operating automatically upon the opening of the elevator door to actuate the control valve to close the regulating valve and cause the pressure fluid within the auxiliary system to act upon the disks to shift the same and the coupled shipper mechanism to an intermediate locked position.

24. In a control device for elevators, the combination, with an operating valve and shipper mechanism acting thereon, of means to control and actuate the valve acting independently of shipper mechanism, and means operative through said actuating means when the elevator door is open to throw the operating valve and shipper mechanism automatically to an inoperative position.

25. In a control device for elevators, the combination, with an operating valve, shipper mechanism acting thereon, and means to close said valve acting independently of the shipper mechanism, of a member movably mounted adjacent the elevator door, and a connection between said member and the valve closing means whereby the opening of the elevator door will operate to automatically stop the elevator.

26. In a control device for elevators, the combination, with an operating valve, shipper mechanism acting thereon, and means to control and actuate the shipper mechanism of a lever pivoted adjacent the elevator door and arranged to be operated by the opening of the door, and a mechanical connection between the lever and means controlling and actuating the shipper mechanism whereby the opening of the door will operate to shift the shipper mechanism to an inoperative position.

27. In a control device for elevators, the combination, with an operating valve, shipper mechanism acting thereon, and means to control and actuate the shipper mechanism of a lever pivoted adjacent the elevator door and provided with an anti-friction roll arranged to ride upon the door when opened, and a mechanical connection between the lever and means controlling and actuating the shipper mechanism whereby the opening of the door will operate to shift the shipper mechanism to an inoperative locked position.

28. In a control device for elevators, the combination, with an operating valve, shipper mechanism acting thereon, and means to control and actuate the shipper mechanism of means tending to act upon the controlling and actuating means to shift the shipper mechanism to an inoperative position, a detent holding said shifting means out of action, and a trip under the control of the elevator conductor for displacing the detent to permit the shifting of the shipper mechanism.

29. In a control device for elevators, the combination, with an operating valve, shipper mechanism acting thereon, and means to control and actuate the shipper mechanism of a spring pressed bolt connected with said controlling and actuating means and tending to act upon the same to shift the shipper mechanism to an inoperative position, a detent holding said bolt out of action, and a trip under the control of the elevator conductor for displacing the detent to release the bolt to permit the shifting of the shipper mechanism.

30. In a control device for elevators, the combination, with an operating valve and shipper mechanism acting thereon, of means operating automatically to throw said shipper mechanism from an operative into an inoperative position, and means under the control of the conductor and other than the shipper mechanism for shifting the shipper mechanism into an inoperative position.

31. In a control device for elevators, the combination, with an operating valve and shipper mechanism acting thereon, of an auxiliary valve and motor system coupled with the shipper mechanism, and distinct means one under the control of the elevator conductor and the other acting automatically through the auxiliary system to throw the shipper mechanism into an inoperative position.

32. In a control device for elevators, the combination, with an operating valve and shipper mechanism acting thereon, of an auxiliary valve and motor system coupled with the shipper mechanism, and distinct means one under the control of the elevator conductor and the other beyond his control and acting automatically upon the opening of an elevator door to throw the shipper mechanism into an inoperative locked position.

33. In a control device for elevators, the combination, with an operating valve and shipper mechanism acting thereon, of an auxiliary valve and motor system coupled with the shipper mechanism, a lever pivoted adjacent the elevator door beyond the control of the elevator conductor and arranged to be actuated by the opening of the door, a spring pressed bolt, a detent holding said bolt out of action, a trip under the control of the elevator conductor for displacing the detent to release the bolt, and means connecting the lever and bolt with the auxiliary system whereby the shifting of the lever or the releasing of the bolt will act through the auxiliary system to throw the shipper mechanism into an inoperative locked position.

34. In a control device for elevators, the combination, with an operating valve and shipper mechanism acting thereon, of an auxiliary valve and motor system coupled with the shipper mechanism, a lever pivoted adjacent the elevator door and arranged to be actuated by the opening of the door, and a mechanical connection between the lever and auxiliary system whereby the opening of the door will shift the shipper mechanism to an inoperative position.

35. In a control device for elevators, the combination, with an operating valve and shipper mechanism acting thereon, of an auxiliary valve and motor system coupled with the shipper mechanism, a pressure fluid supply to the auxiliary system, a control valve governing the discharge therefrom, a lever pivoted adjacent the elevator door and arranged to ride upon the door when opened, and a connection between the lever and control valve whereby the opening of the door will through the auxiliary system shift the shipper mechanism to an inoperative position.

36. In a control device for elevators, the combination, with an operating valve and shipper mechanism acting thereon, of an auxiliary valve and motor system positively coupled with the shipper mechanism, a pressure fluid supply to the auxiliary system, a regulating valve in the discharge therefrom, a control valve governing the operation of the regulating valve, a lever pivoted adjacent the elevator door and arranged to ride upon the door when opened, and a connection between the lever and control valve whereby the opening of the door will through the auxiliary system shift the shipper mechanism to an inoperative position.

37. In a control device for elevators, the combination, with an operating valve and shipper mechanism acting thereon, of an auxiliary valve and motor system coupled with the shipper mechanism and comprising a pair of twin valves having their stems provided with spaced disks controlling inlet and outlet ports and a valve motor having its stem provided with a disk, a control valve arranged to govern the discharge from the auxiliary system, a pressure fluid supply at one position of the shipper mechanism and valves through one of the twin valves and one end of the valve motor to the discharge and at another position thereof through the other twin valve and the other end of the valve motor to the discharge, a lever pivoted adjacent the door and arranged to ride upon the door when opened, and a connection between the lever and control valve whereby the opening of the door will operate the auxiliary system and shift the shipper mechanism to an inoperative position.

38. In a control device for elevators, the combination, with an operating valve and shipper mechanism acting thereon, of an auxiliary valve and motor mechanism coupled with the shipper mechanism and comprising a pair of twin valves having their stems rigidly coupled by a rack and provided with spaced disks controlling inlet and outlet ports and a valve motor having its stem provided with a disk and a rack, a spindle coupled to the shipper mechanism and carrying pinions in engagement with the racks, a control valve in the discharge from the auxiliary system, a pressure fluid supply at one position of the valves through one of the twin valves and one end of the valve motor to the discharge and at another position thereof through the other twin valve and the other end of the valve motor to the discharge, check valves in the supply to each of the twin valves and between the two ends of the valve motor, a lever pivoted adjacent the elevator door and arranged to ride upon the door when opened, and a connection between the lever and control valve whereby the opening of the door will operate the auxiliary system to shift the shipper mechanism to an inoperative locked position.

39. In a control device for elevators, the combination, with an operating valve and shipper mechanism acting thereon, of an auxiliary valve and motor system comprising a pair of twin valves having their stems rigidly coupled by a rack and provided with spaced disks controlling inlet and outlet ports and a valve motor having a stem provided with a disk and with a rack, a spindle coupled to the shipper mechanism and carrying pinions in engagement with the racks, a regulating valve operable by variations in fluid pressure arranged in the discharge from the auxiliary system, a pressure fluid supply at one position of the valves through one end of the twin valves and one end of the valve motor to the discharge and at another position thereof through the other twin valve and the other end of the valve motor to the discharge, check valves in the supply to each of the twin valves and between the two ends of the valve motor, an auxiliary pressure pipe extending by way of the regulating valve to a point adjacent the elevator shaft, a control valve in the auxiliary pressure pipe beyond the regulating valve, a lever pivoted adjacent the elevator door and arranged to ride upon the door when opened, and a connection between the lever and the stem of the control valve whereby the opening of the elevator door will through the auxiliary system shift the shipper mechanism to an inoperative locked position.

40. In a control device for elevators, the combination with an operating valve and shipper mechanism acting thereon, of an auxiliary valve and motor system coupled with the shipper mechanism and comprising a pair of twin valves having their stems provided with spaced disks controlling inlet and outlet ports and a valve motor having its stem provided with a disk, a pressure fluid supply at one position of the shipper mechanism and valves through one of the twin valves to the discharge and at another position thereof through the other twin valve to the discharge, a control valve arranged to govern the discharge from the auxiliary system, a connection between each of the twin valves and each end of the valve motor, and means operating automatically upon the opening of the elevator door to close the control valve to cause the pressure fluid within the auxiliary system to act upon the disk of the valve motor and shift the same and the coupled shipper mechanism to an inoperative position.

41. In a control device for elevators, the combination, with an operating valve and shipper mechanism acting thereon, of an auxiliary valve and motor system coupled with the shipper mechanism, a pressure fluid supply to the auxiliary system, a control valve arranged directly in the discharge from the auxiliary system, and a connection between the stem of the control valve and the elevator door whereby the opening of the door will actuate the control valve to cause the operation by the pressure fluid of the auxiliary system and through it the shifting of the shipper mechanism to an inoperative position.

In testimony whereof I affix my signature to this specification, in the presence of two witnesses.

SAMUEL S. TEAGUE.

Witnesses:
L. T. GREIST,
EDWIN O. HILDEBRAND.